US012639262B2

(12) United States Patent
Mahajan et al.

(10) Patent No.: US 12,639,262 B2
(45) Date of Patent: May 26, 2026

(54) MACHINE LEARNING BASED CONVERSION OF UNSTRUCTURED VOICE DATA INTO EXECUTABLE FILES

(71) Applicant: BANK OF AMERICA CORPORATION, Charlotte, NC (US)

(72) Inventors: Nipun Mahajan, Lawrenceville, NJ (US); Krithika Viswanathan, Moulivakkam (IN); Amit Mishra, Egattur (IN); S.B. Pravin Kumar, Tamil Nadu (IN); Yogesh Raghuvanshi, Pennington, NJ (US); Sushil Golani, Waxhaw, NC (US); Robert E. Lutzkow, Phillipsburg, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/623,662

(22) Filed: Apr. 1, 2024

(65) Prior Publication Data
US 2025/0307211 A1 Oct. 2, 2025

(51) Int. Cl.
*G06F 16/16* (2019.01)

(52) U.S. Cl.
CPC .................................... *G06F 16/16* (2019.01)

(58) Field of Classification Search
CPC ...................................................... G06F 16/16
See application file for complete search history.

(56) References Cited

U.S. PATENT DOCUMENTS

| | | | |
|---|---|---|---|
| 6,594,347 B1 | 7/2003 | Calder | |
| 6,601,031 B1 | 7/2003 | O'Brien | |
| 7,062,019 B2 | 6/2006 | Krack | |
| 8,718,262 B2 | 5/2014 | Conway | |
| 8,917,827 B2 | 12/2014 | Gupta | |
| 9,224,389 B2 | 12/2015 | Odinak | |
| 9,245,525 B2 | 1/2016 | Yeracaris | |
| 9,336,774 B1 | 5/2016 | Kurzweil | |
| 9,430,465 B2 | 8/2016 | Waibel | |
| 9,444,939 B2 | 9/2016 | Ryan | |
| 9,449,602 B2 | 9/2016 | Ooi | |
| 10,134,399 B2 | 11/2018 | Lang | |
| 11,163,961 B2 | 11/2021 | Beaver | |
| 11,763,096 B2 * | 9/2023 | Tunstall-Pedoe | ........................... G10L 15/1815 704/9 |
| 2004/0054523 A1 | 3/2004 | Backhaus | |
| 2007/0271104 A1 | 11/2007 | McKay | |
| 2009/0006085 A1 | 1/2009 | Horvitz | |

(Continued)

*Primary Examiner* — Mohammad S Rostami
(74) *Attorney, Agent, or Firm* — Moore & Van Allen PLLC; Gabrielle M. Carlini

(57) ABSTRACT
Embodiments of the invention are directed to systems, methods, and computer program products for conversion of unstructured voice inputs into an executable file. In some embodiments, the method includes using a first machine learning engine to generate a first workflow, accessing a plurality of unstructured voice inputs from a remote server, using a sequencing module to match each of the plurality of unstructured voice inputs to at least one workflow node of the plurality of workflow nodes, and using a session recreation module to generate an executable file, where the executable file comprises the plurality of unstructured voice inputs and at least one stored prompt of a plurality of stored prompts.

18 Claims, 5 Drawing Sheets

(56)　　　　　　　References Cited

U.S. PATENT DOCUMENTS

| | | | |
|---|---|---|---|
| 2015/0302852 A1* | 10/2015 | Lu | G10L 15/30 |
| | | | 704/246 |
| 2016/0165050 A1 | 6/2016 | Odinak | |
| 2016/0217807 A1 | 7/2016 | Gainsboro | |
| 2018/0176382 A1 | 6/2018 | Ristock | |
| 2019/0349478 A1 | 11/2019 | Conway | |
| 2020/0364343 A1* | 11/2020 | Atighetchi | G06F 8/427 |
| 2021/0264202 A1* | 8/2021 | Kalluri | G06N 20/00 |
| 2022/0083597 A1* | 3/2022 | Atore | G06F 16/90332 |
| 2022/0366901 A1* | 11/2022 | Rathaur | G06F 16/245 |
| 2022/0382977 A1* | 12/2022 | Parrish | G06F 40/279 |
| 2023/0083891 A1* | 3/2023 | Achin | G06F 3/0484 |
| | | | 715/762 |
| 2023/0195100 A1* | 6/2023 | Subramanian | G05B 23/0221 |
| | | | 702/184 |
| 2023/0342428 A1* | 10/2023 | Kramer | G06N 3/088 |
| 2024/0220791 A1* | 7/2024 | Jayaraman | G06N 3/08 |
| 2024/0241701 A1* | 7/2024 | Ramsundar | G06F 11/3433 |
| 2024/0362465 A1* | 10/2024 | Munguia Tapia | G06N 3/0464 |
| 2025/0166626 A1* | 5/2025 | Garcia | G10L 15/26 |

* cited by examiner

MACHINE LEARNING BASED CONVERSION OF UNSTRUCTURED VOICE DATA INTO EXECUTABLE FILES

FIELD OF THE INVENTION

The present invention embraces a system for conversion of unstructured voice inputs into an executable file.

BACKGROUND

There is a need for a system that automatically converts unstructured voice inputs into executable files.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for conversion of unstructured voice inputs into an executable file, the invention including: using a first machine learning engine to generate a first workflow, where at least one application workflow, at least one application log, and a plurality of potential nodes are inputs of the machine learning engine, and where the first workflow includes a plurality of workflow nodes; accessing a plurality of unstructured voice inputs from a remote server; using a sequencing module to match each of the plurality of unstructured voice inputs to at least one workflow node of the plurality of workflow nodes; and using a session recreation module to generate an executable file where the executable file includes the plurality of unstructured voice inputs and at least one stored prompt of a plurality of stored prompts.

In some embodiments, the invention further includes using a document parsing engine to extract the plurality of potential nodes from a technical document.

In some embodiments, the invention further includes accessing at least one application workflow and at least one application log, where the at least one application workflow and the at least one application log are associated with the technical document.

In some embodiments, the invention further includes using a second machine learning engine to determine that the first workflow exceeds a predetermined threshold confidence value and storing the first workflow in a database.

In some embodiments, the invention further includes classifying each workflow node of the plurality of workflow nodes as either a user type or a prompt type; and, for each workflow node classified as a prompt type, identifying an associated stored prompt from the plurality of stored prompts.

In some embodiments, the executable file is an audio file.

In some embodiments, the session recreation module is configured to, based on an output of the sequencing module, access the at least one stored prompt from a database.

In some embodiments, the invention further includes transmitting the executable file to a user device, where the user device is configured to read the executable file.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
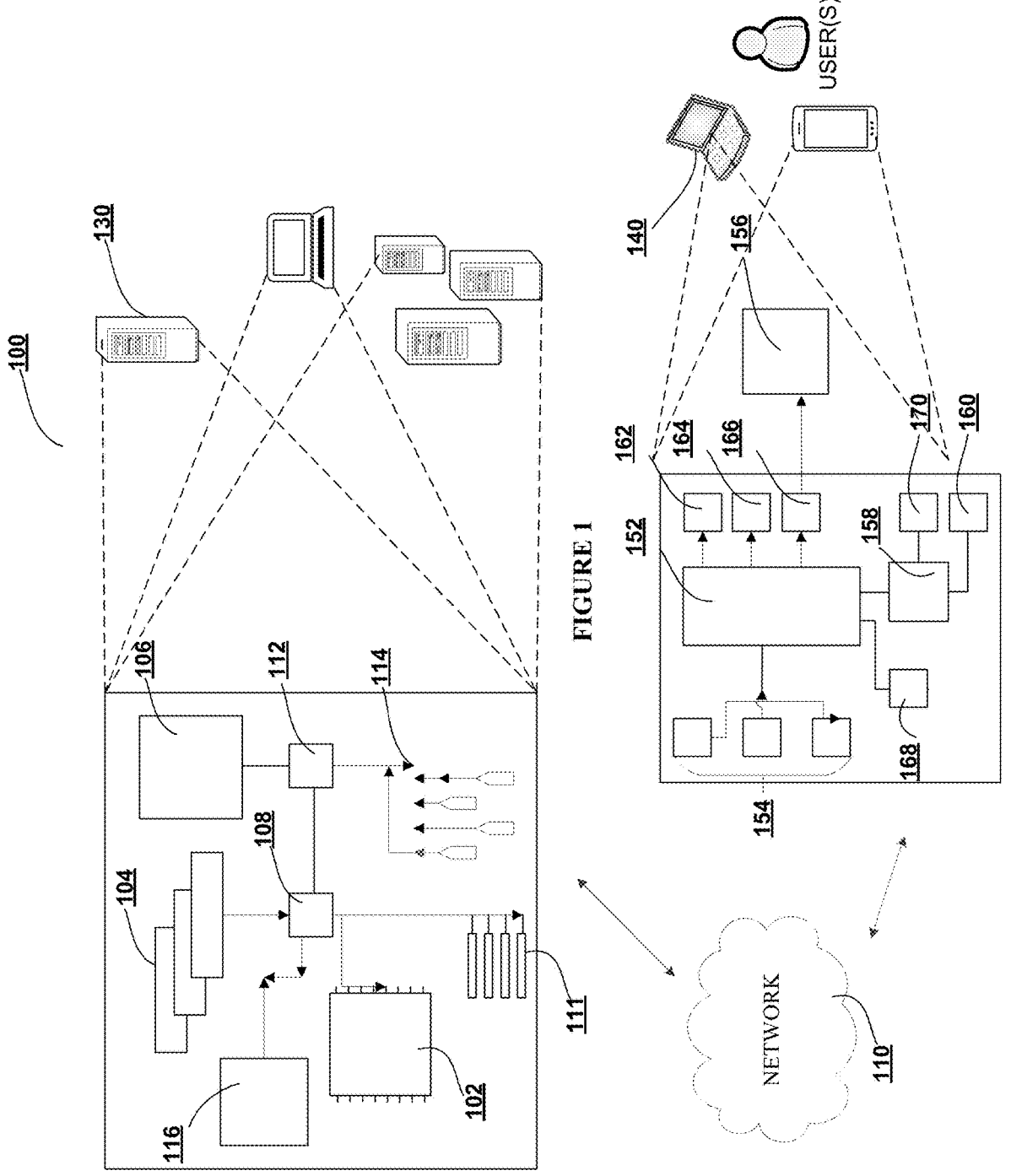
Figure 2:
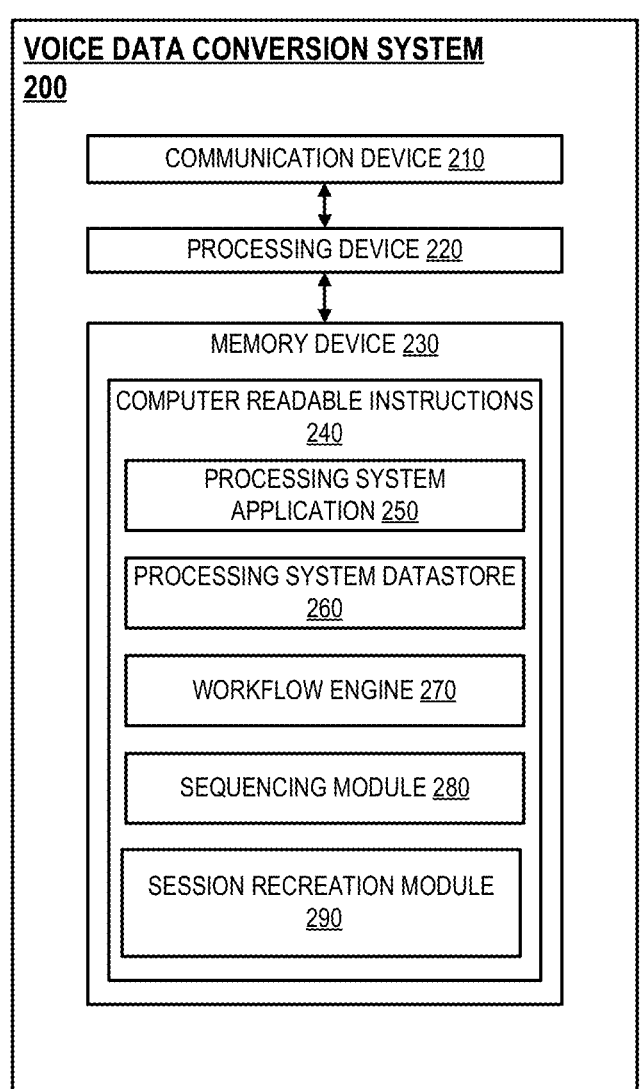
Figure 3:
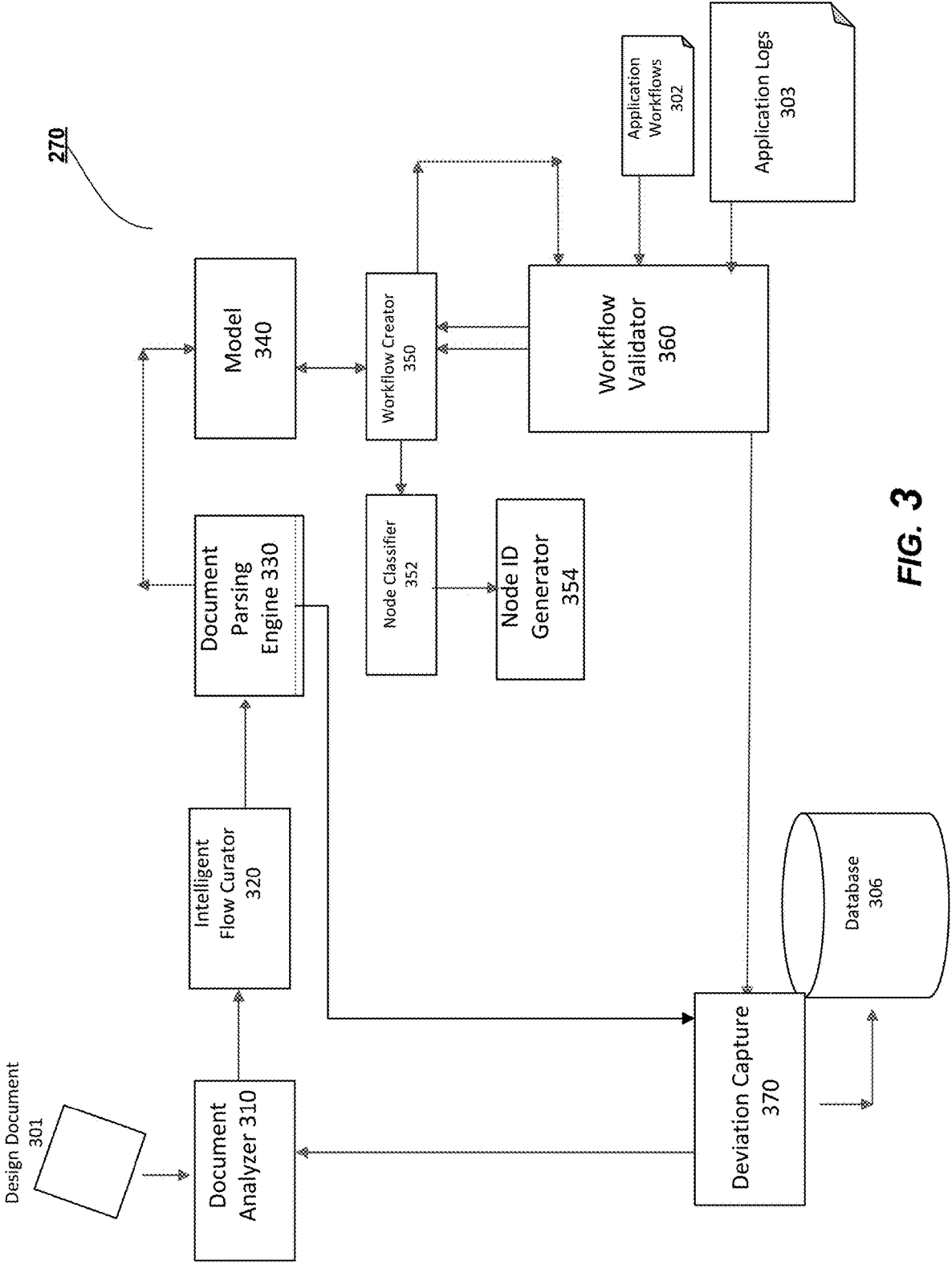
Figure 4:
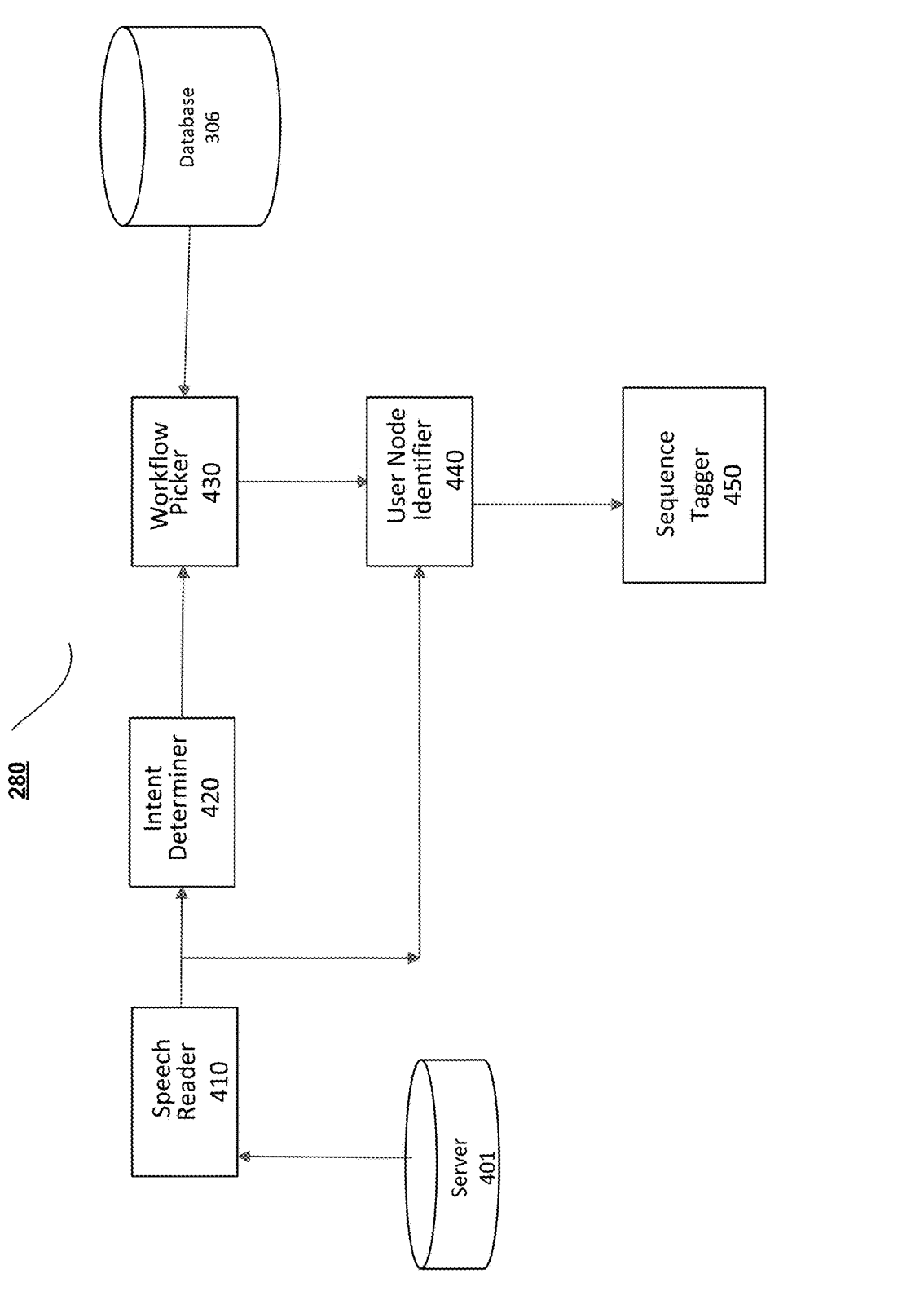
Figure 5:
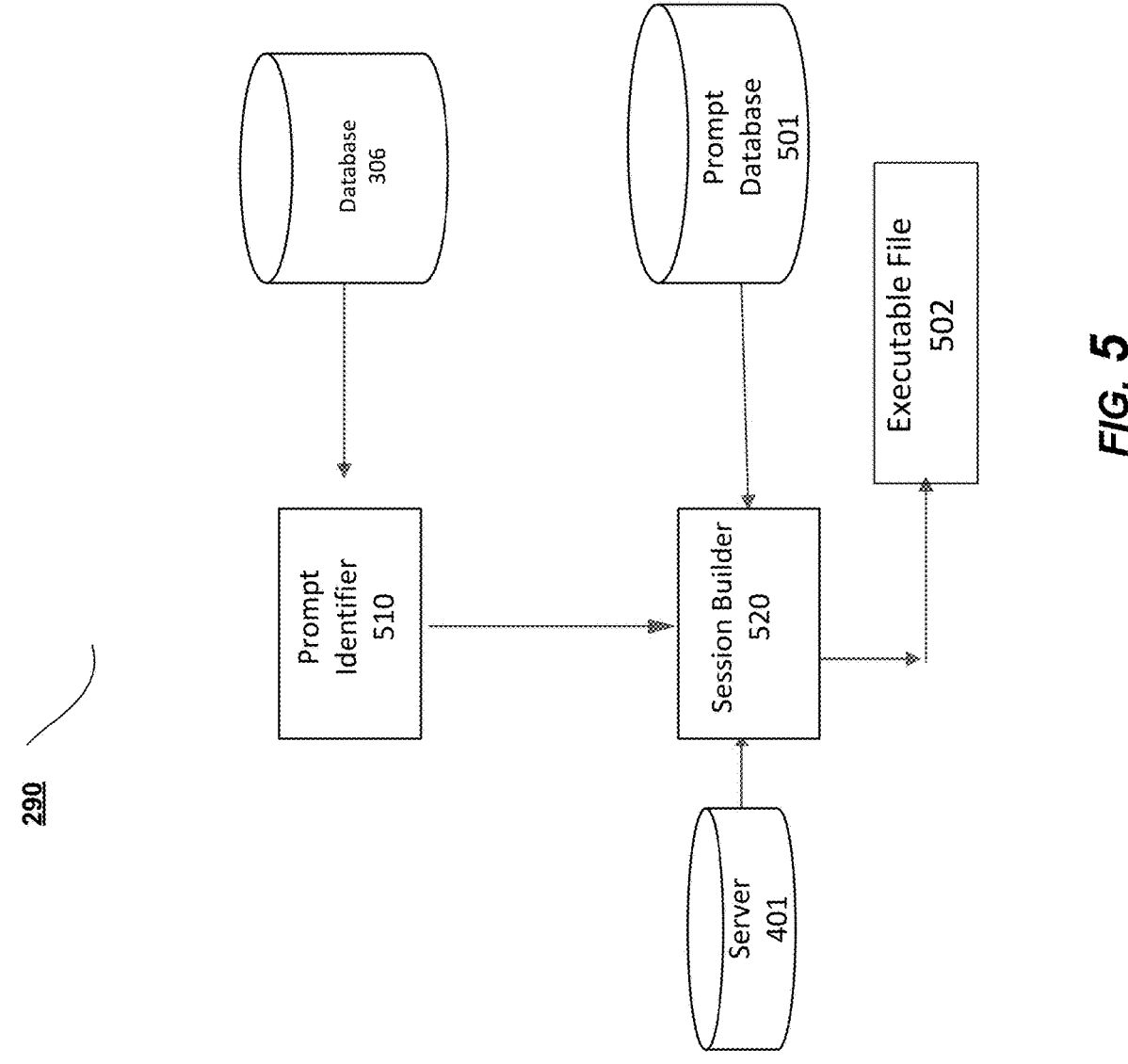

Having thus described embodiments of the invention in general terms, reference will now be made to the accompanying drawings, wherein:

FIG. 1 illustrates technical components of a system environment for conversion of unstructured voice inputs into an executable file, in accordance with one embodiment of the present disclosure;

FIG. 2 is a block diagram illustrating the system for conversion of unstructured voice inputs into an executable file, in accordance with on embodiment of the present disclosure;

FIG. 3 illustrates a workflow engine of a voice data conversion system, in accordance with one embodiment of the present disclosure;

FIG. 4 illustrates a sequencing module of a voice data conversion system, in accordance with one embodiment of the present disclosure; and FIG. 5 illustrates a session recreation module of a voice data conversion system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

As used herein, an "entity" may be any institution employing information technology resources and particularly technology infrastructure configured for managing electronic workflows. Typically, these workflows can be related to the people who work for the organization, its products or services, the customers or any other aspect of the operations of the organization. As such, the entity may be any institution, group, association, financial institution, establishment, company, union, authority or the like, employing information technology resources for managing electronic workflows.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "production environment" includes various components used to deploy, implement, access, and use, a given application as that application is intended to be used. In various embodiments, production environments include multiple production environment components that are combined; communicatively coupled; virtually and/or physically connected; and/or associated with one another, to provide the production environment implementing the application. In some embodiments, the production environment components making up a given production environment can include, but are not limited to, one or more computing environments used to implement the application in the production environment such as a data center, a cloud computing environment, and/or one or more other computing environments in which one or more components and/or services used by the application in the production environment are implemented; one or more computing systems or computing entities used to implement the application in the production environment; one or more supervisory or control systems, such as hypervisors, used to implement the application in the production environment; one or more communications channels used to implement the application in the production environment; one or more access control systems, such as firewalls and gateways, used to implement the application in the production environment; one or more routing systems, such as routers and switches, used to implement the application in the production environment; one or more communications endpoint proxy systems, such as load balancers or buffers, used to implement the application in the production environment; one or more traffic or access control systems used to implement the application in the production environment; one or more secure communication protocols and/or endpoints, such as Secure Sockets Layer (SSL) protocols, used to implement the application in the production environment; one or more databases used to implement the application in the production environment; one or more internal or external services used to implement the application in the production environment; one or more backend systems, such as backend servers or other hardware used to implement the application in the production environment; one or more software systems used to implement the application in the production environment; and/or any other components making up an actual production environment in which an application is to be deployed, implemented, accessed, and run, as discussed herein, and/or as known in the art at the time of filing, and/or as developed after the time of filing.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making a prediction about a dataset. Machine learning algorithms contemplated, described, and/or used herein include supervised learning (e.g., using logistic regression, using back propagation neural networks, using random forests, decision trees, and the like), unsupervised learning (e.g., using an Apriori algorithm, using K-means clustering), semi-supervised learning, reinforcement learning (e.g., using a Q-learning algorithm, using temporal difference learning), and/or any other suitable machine learning model types. Each of these types of machine learning algorithms can implement any of one or more of a regression algorithm (e.g., ordinary least squares, logistic regression, stepwise regression, multivariate adaptive regression splines, locally estimated scatterplot smoothing, and the like), an instance-based method (e.g., k-nearest neighbor, learning vector quantization, self-organizing map, and the like), a regularization method (e.g., ridge regression, least absolute shrinkage and selection operator, elastic net, and the like), a decision tree learning method (e.g., classification and regression tree, C4.5, chi-squared automatic interaction detection, decision stump, random forest, multivariate adaptive regression splines, gradient boosting machines, and the like), a Bayesian method (e.g., naïve Bayes, averaged one-dependence estimators, Bayesian belief network, and the like), a kernel method (e.g., a support vector machine, a radial basis function, a linear analysis, and the like), a clustering method (e.g., k-means clustering, expectation maximization, and the like), an associated rule learning algorithm, an artificial neural network model (e.g., a Perceptron method, a back-propagation method, a Hopfield network method, a self-organizing map method, a learning vector quantization method, and the like), a deep learning algorithm (e.g., a deep belief network method, a convolution network method, a stacked auto-encoder method, and the like), a dimensionality reduction method (e.g., principal component analysis, partial least squares regression, multidimensional scaling, projection pursuit, and the like), an ensemble method (e.g., boosting, bootstrapped aggregation, stacked generalization, gradient boosting machine method, random forest method, and the like), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

In conventional interactive voice systems, recording every incoming call to an entity is a highly resource-intensive process, requiring large amounts of both computational power and system storage. Thus, the present invention is directed to a system which can recreate an interactive voice session without the need to record every incoming call. Specifically, the system uses a machine learning engine to generate a database of potential workflows based on technical documentation and application logs. The system then identifies a series of matches between raw unstructured voice inputs and steps in potential workflows. Once the system identifies which workflow is associated with the sequence of voice inputs, it can generate an audio file recreating the full session.

FIG. 1 presents an exemplary block diagram of a system environment for conversion of unstructured voice inputs into an executable file 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is one or more user(s) of the user input system 140. The user input system 140 is intended to represent various forms of mobile devices, such as laptops, personal digital assistants, augmented reality (AR) devices, virtual reality (VR) devices, extended reality (XR) devices, and/or the like, and non-mobile devices such as desktops, video recorders, audio/video player, radio, workstations, and/or the like. The user may be a person who uses the user input system 140 to execute one or more processes described herein using one or more applications stored thereon. The one or more applications may be configured to communicate with the system 130, execute a process or method, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, electronic kiosk devices, blade servers, mainframes, or any combination of the aforementioned. The user input system 140 is intended to represent various forms of personal devices, such as laptops, desktops, mobile devices, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by an entity. The system 130 may be located at a facility associated with the entity or remotely from the facility associated with the entity.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flow discussed in greater detail with respect to FIG. 2. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a block diagram of a system for conversion of unstructured voice inputs into an executable file, also referred to as a voice data conversion system 200, in accordance with embodiments of the present invention. As illustrated in FIG. 2, the voice data conversion system 200 may include a communication device 210, a processing device 220, and a memory device 230 having a workflow engine 270, a sequencing module 280, a session recreation module 290, a processing system application 250 and a processing system datastore 260 stored therein. As shown, the processing device 220 is operatively connected to and is configured to control and cause the communication device 210 and the memory device 230 to perform one or more functions. In some embodiments, the sequencing module

280, the session recreation module 290, the workflow engine 270 and/or the processing system application 250 comprise computer readable instructions 240 that when executed by the processing device 220 cause the processing device 220 to perform one or more functions and/or transmit control instructions to other systems, applications, and/or devices in the system environment 100. It will be understood that the sequencing module 280, the session recreation module 290, the workflow engine 270 and/or the processing system application 250 may be executable to initiate, perform, complete, and/or facilitate one or more portions of any embodiments described and/or contemplated herein.

The workflow engine 270, as described in greater detail with respect to FIG. 3, may store instructions and/or data that may cause or enable the voice data conversion system 200 to receive, store, and/or analyze data received by the sequencing module 280, session recreation module 290, and/or communication device 210. The workflow engine 270 may process data and/or metadata to generate workflows as is further discussed with respect to FIG. 3. The workflow engine 270 may comprise a plurality of machine learning engines configured to receive data from a plurality of sources and, using one or more machine learning algorithms, may generate one or more machine learning datasets. Various machine learning algorithms may be used without departing from the invention as is described in greater detail herein.

The communication device 210 may generally include a modem, server, transceiver, and/or other devices for communicating with other devices on the network 101. The communication device 210 may be a communication interface having one or more communication devices configured to communicate with one or more other devices on the network 101.

Additionally, referring to the voice data conversion system 200 illustrated in FIG. 2, the processing device 220 may generally refer to a device or combination of devices having circuitry used for implementing the communication and/or logic functions of the voice data conversion system 200. For example, the processing device 220 may include a control unit, a digital signal processor device, a microprocessor device, and various analog-to-digital converters, digital-to-analog converters, and other support circuits and/or combinations of the foregoing. Control and signal processing functions of the voice data conversion system 200 may be allocated between these processing devices according to their respective capabilities. The processing device 220 may further include functionality to operate one or more software programs based on computer-executable program code or computer readable instructions 240 thereof, which may be stored in a memory device 230, such as the processing system application 250 and the workflow engine 270. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 220 may be configured to use the network communication interface of the communication device 210 to transmit and/or receive data and/or commands to and/or from the other devices/systems connected to the network 101.

The memory device 230 within the voice data conversion system 200 may generally refer to a device or combination of devices that store one or more forms of computer-readable media for storing data and/or computer-executable program code/instructions. For example, the memory device 230 may include any computer memory that provides an actual or virtual space to temporarily or permanently store data and/or commands provided to the processing device 220 when it carries out its functions described herein. As used herein, memory may include any computer readable medium configured to store data, code, or other information. The memory device 350 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EE-PROM), flash memory or the like.

In some instances, various features and functions of the invention are described herein with respect to a "system." In some instances, the system may refer to the voice data conversion system 200 performing one or more steps described herein in conjunction with other devices and systems, either automatically based on executing computer readable instructions of the memory device 230, or in response to receiving control instructions from another device in the system environment 100. In some instances, the system refers to the devices and systems on the system environment 100 of FIG. 1. The features and functions of various embodiments of the invention are be described below in further detail. It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 is a high-level process flow diagram illustrating a process using the workflow engine 270 of the voice data conversion system 200, in accordance with one embodiment of the present disclosure. The process begins with a document analyzer 310 accessing a design document 301. The design document 301 may comprise a technical document, where the technical document contains information related to system requirements of a production environment associated with an entity. In some embodiments, the document analyzer 310 may be configured to automatically access design documents 301 as design documents 301 are created or updated within an entity system.

The document analyzer 310 may then input information from the design document 301 into an intelligent flow curator 320, where the intelligent flow curator 320 is configured to apply one or more natural language processing ("NLP") techniques to the information from the design document 301. In some embodiments, the intelligent flow curator 320 is configured to use the one or more NLP techniques to identify one or more known terms and one or more known features used within the production environment of the entity system. The intelligent flow curator 320 may then generate a connection map (e.g., a concept lattice and/or the like), where the connection map identifies all potential relationships between the known terms and features. The connection map may further score each potential relationship based on a combination of historical data and an output of the one or more NLP techniques.

The process flow may then continue with a document parsing engine 330 receiving the connection map generated by the intelligent flow curator 320. The document parsing engine 330 may be configured to extract a plurality of potential nodes from the design document, where each potential node represents a potential step in a workflow. For example, potential nodes may include workflow steps such as accessing particular data, checking authentication credentials, initiating a secondary workflow, and/or the like. In some embodiments, the plurality of potential nodes may be input into a data model 340, where the data model 340 is configured to convert the potential nodes into a preferred format for performance of subsequent steps of the process flow.

The process flow may then continue with a workflow creator 350 generating a first workflow. In some embodiments, the workflow creator 350 may receive the data model 340 as an input, where the data model 340 includes the plurality of potential nodes extracted by the document parsing engine. The workflow creator 350 may additionally or alternatively receive an input from a workflow validator 360, where the workflow validator 360 is configured to access known application workflows and/or application logs from a remote server or another entity system. In some embodiments, the input from the workflow validator 360 may comprise at least one application workflow and the at least one application log that are associated with the design document 301. The workflow creator 350 may then use a first machine learning engine to generate the first workflow, where the first workflow comprises a plurality of workflow nodes. "Workflow node" as used herein refers to any break point in a process, where the break point expects an input. For example, workflow nodes may include steps such as accessing particular data, checking authentication credentials, initiating a secondary workflow, and/or the like.

In some embodiments, the process flow may then continue with a node classifier 352 reading each of the plurality of workflow nodes and classifying the workflow as either a user type or prompt type. For example, a user type may comprise any workflow node that requires a user input, and/or an input received from outside of entity system. A prompt type may comprise any workflow node that requires an input from within the entity system. Each workflow node may then be assigned a unique node ID by a node ID generator 354. The node ID generator 354 may be configured to generate new node IDs and/or access a database of potential node IDs.

The process flow may then continue to a deviation capture module 370, where the deviation capture module 370 is configured to use a second machine learning engine to evaluate the first workflow against sample inputs accessed from the workflow validator 360. The deviation capture module 370 may then evaluate errors in the first workflow and generate a workflow score. If the workflow score exceeds a predetermined threshold confidence value, the deviation capture module 370 may then store the first workflow in a workflow database 306. If the workflow score does not exceed the predetermined threshold confidence value, the deviation capture module 370 may cause the document analyzer 310 to rerun the process flow.

FIG. 4 is a high-level process flow diagram illustrating a process using the sequencing module 280 of the voice data conversion system 200, in accordance with one embodiment of the present disclosure. The process flow may begin with a speech reader module 410 accesses a plurality of unstructured voice inputs from one or more remote servers 401. Unstructured voice inputs may comprise any voice inputs received by the entity which may be stored in a permanent or temporary memory. The speech reader 410 may select the plurality of unstructured voice inputs based on an instruction received by the communication device 210.

The plurality of unstructured voice inputs may then be processed by an intent determiner module 420, where the intent determiner module 420 is configured to apply one or more machine learning algorithms to identify known terms or known features associated with each unstructured voice input. Then, a workflow picker module 430 may use the output of the intent determiner module 420 to query the workflow database 306 for one or more stored workflows associated with the unstructured voice inputs. Then, a user node identifier module 440 may identify, for each unstructured voice input identified by the speech reader 410, a user type workflow node of the one or more stored workflows. A sequence tagger module 450 may then match each of the plurality of unstructured voice inputs to at least one workflow node by tagging each unstructured voice input with the unique node ID of the matching workflow node.

FIG. 5 is a high-level process flow diagram illustrating a process using the session recreation module 290 of the voice data conversion system 200, in accordance with one embodiment of the present disclosure. The process flow may begin with a session builder module 520 receiving inputs from the sequencing module 280, a prompt identifier module 510, the remote server 401, and a prompt database 501. The prompt identifier module 510 may be configured to, based on the node IDs of each unstructured voice input from the sequencing module 280, access a second workflow from the workflow database 306. The session builder module 520 may then, based on the node IDs, assign each unstructured voice input to each user type node of the second workflow. Then session builder module 520 may then query the prompt database 501 to access a stored voice prompt associated with each prompt type node of the second workflow. The session builder module 520 may then combine the plurality of unstructured voice inputs and the stored voice prompts into a single executable file, where the executable file comprises an audio file of each unstructured voice input and stored voice prompt in an order or sequence associated with the second workflow. In some embodiments, the voice data conversion system 200 may then transmit the executable file to a user device of the entity system, where the user device is configured to read the executable file.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable program-mable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-ori-ented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural program-ming languages, such as the "C" programming languages and/or similar programming languages. The computer pro-gram code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodi-ments, merely conceptual delineations between systems and one or more of the systems illustrated by a block in the block diagrams may be combined or share hardware and/or soft-ware with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a tran-sitory or non-transitory computer-readable medium (e.g., a memory, and the like) that can direct a computer and/or other programmable data processing apparatus to function in a particular manner, such that the computer-executable pro-gram code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable appa-ratus provide operational steps to implement the steps speci-fied in the flowchart(s) and/or the functions specified in the block diagram block(s). Alternatively, computer-imple-mented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and sub-stitutions, in addition to those set forth in the above para-graphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for conversion of unstructured voice inputs into an executable file, the system comprising:

at least one non-transitory storage device; and at least one processing device coupled to the at least one non-transitory storage device, wherein the at least one processing device is configured to:

automatically access at least one technical document based on determining that the at least one technical document was updated within an entity system, wherein the at least one technical document com-prises one or more system requirements of a produc-tion environment associated with the entity system;

using one or more natural language processing algo-rithms, identify, from the one or more system requirements, a plurality of features associated with the production environment;

generate a connection map, wherein the connection map identifies one or more relationships between each of the plurality of features associated with the production environment;

based on the connection map and the at least one technical document, extract a plurality of potential nodes;

using a first machine learning engine, generate a first workflow, wherein at least one application workflow, at least one application log, and the plurality of potential nodes are inputs of the machine learning engine, and wherein the first workflow comprises a plurality of workflow nodes;

access a plurality of unstructured voice inputs from a remote server;

using a sequencing module, match each of the plurality of unstructured voice inputs to at least one workflow node of the plurality of workflow nodes; and using a session recreation module, generate an execut-able audio file wherein the executable audio file comprises each of the plurality of unstructured voice inputs and at least one stored prompt of a plurality of stored prompts in a sequence associated with the first workflow, such that the executable audio file recre-ates an interactive voice session associated with the at least one application log.

2. The system of claim 1, wherein the at least one processing device is further configured to, using a document parsing engine, extract the plurality of potential nodes from a technical document.

3. The system of claim 2, wherein the at least one processing device is further configured to access at least one application workflow and at least one application log, wherein the at least one application workflow and the at least one application log are associated with the technical document.

4. The system of claim 1, wherein the at least one processing device is further configured to:

using a second machine learning engine, determine that the first workflow exceeds a predetermined threshold confidence value; and store the first workflow in a database.

5. The system of claim 1, wherein the at least one processing device is further configured to:

classify each workflow node of the plurality of workflow nodes as either a user type or a prompt type; and for each workflow node classified as a prompt type, identify an associated stored prompt from the plurality of stored prompts.

6. The system of claim 1, wherein the session recreation module is configured to:

based on an output of the sequencing module, access the at least one stored prompt from a database.

7. The system of claim 1, wherein the at least one processing device is further configured to transmit the executable file to a user device, wherein the user device is configured to read the executable file.

8. A computer program product for conversion of unstructured voice inputs into an executable file, the computer program product comprising at least one non-transitory computer-readable medium having computer-readable program code portions embodied therein, the computer-readable program code portions comprising:

automatically access at least one technical document based on determining that the at least one technical document was updated within an entity system, wherein the at least one technical document comprises one or more system requirements of a production environment associated with the entity system;

using one or more natural language processing algorithms, identify, from the one or more system requirements, a plurality of features associated with the production environment;

generate a connection map, wherein the connection map identifies one or more relationships between each of the plurality of features associated with the production environment;

based on the connection map and the at least one technical document, extract a plurality of potential nodes;

an executable portion configured for, using a first machine learning engine, generating a first workflow, wherein at least one application workflow, at least one application log, and the plurality of potential nodes are inputs of the machine learning engine, and wherein the first workflow comprises a plurality of workflow nodes;

an executable portion configured for accessing a plurality of unstructured voice inputs from a remote server;

an executable portion configured for, using a sequencing module, matching each of the plurality of unstructured voice inputs to at least one workflow node of the plurality of workflow nodes; and an executable portion configured for, using a session recreation module, generate an executable audio file wherein the executable audio file comprises each of the plurality of unstructured voice inputs and at least one stored prompt of a plurality of stored prompts in a sequence associated with the first workflow, such that the executable audio file recreates an interactive voice session associated with the at least one application log.

9. The computer program product of claim 8, further comprising an executable portion configured for, using a document parsing engine, extracting the plurality of potential nodes from a technical document.

10. The computer program product of claim 9, further comprising an executable portion configured for accessing at least one application workflow and at least one application log, wherein the at least one application workflow and the at least one application log are associated with the technical document.

11. The computer program product of claim 8, further comprising an executable portion configured for:

using a second machine learning engine, determining that the first workflow exceeds a predetermined threshold confidence value; and storing the first workflow in a database.

12. The computer program product of claim 8, further comprising an executable portion configured for:

classifying each workflow node of the plurality of workflow nodes as either a user type or a prompt type; and for each workflow node classified as a prompt type, identifying an associated stored prompt from the plurality of stored prompts.

13. The computer program product of claim 8, wherein the session recreation module is configured to:

based on an output of the sequencing module, access the at least one stored prompt from a database.

14. The computer program product of claim 8, further comprising an executable portion configured for transmitting the executable file to a user device, wherein the user device is configured to read the executable file.

15. A computer-implemented method for conversion of unstructured voice inputs into an executable file, the method comprising:

providing a computing system comprising a computer processing device and a non-transitory computer readable medium, wherein the computer readable medium comprises configured computer program instruction code, such that when said instruction code is operated by said computer processing device, said computer processing device performs the following operations:

automatically accessing at least one technical document based on determining that the at least one technical document was updated within an entity system, wherein the at least one technical document comprises one or more system requirements of a production environment associated with the entity system;

using one or more natural language processing algorithms, identifying, from the one or more system requirements, a plurality of features associated with the production environment;

generating a connection map, wherein the connection map identifies one or more relationships between each of the plurality of features associated with the production environment;

based on the connection map and the at least one technical document, extracting a plurality of potential nodes;

using a first machine learning engine, generating a first workflow, wherein at least one application workflow, at least one application log, and the plurality of potential nodes are inputs of the machine learning engine, and wherein the first workflow comprises a plurality of workflow nodes;

accessing a plurality of unstructured voice inputs from a remote server;

using a sequencing module, matching each of the plurality of unstructured voice inputs to at least one workflow node of the plurality of workflow nodes; and using a session recreation module, generating an executable audio file wherein the executable audio file comprises each of the plurality of unstructured voice inputs and at least one stored prompt of a plurality of stored prompts in a sequence associated with the first workflow, such that the executable audio file recreates an interactive voice session associated with the at least one application log.

16. The method of claim 15, the method further comprising:

using a document parsing engine, extracting the plurality of potential nodes from a technical document; and accessing at least one application workflow and at least one application log, wherein the at least one application workflow and the at least one application log are associated with the technical document.

17. The method of claim 15, the method further comprising:

using a second machine learning engine, determining that the first workflow exceeds a predetermined threshold confidence value; and storing the first workflow in a database.

18. The method of claim 15, the method further comprising:

transmitting the executable file to a user device, wherein the user device is configured to read the executable file.

* * * * *